Feb. 5, 1935. C. P. HOWARD Re. 19,447

CONTROL DEVICE FOR ALARM MECHANISM

Original Filed May 19, 1931 2 Sheets-Sheet 1

Inventor
Clifton P. Howard
By Attorneys
Southgate Fay & Hawley

Feb. 5, 1935. C. P. HOWARD Re. 19,447

CONTROL DEVICE FOR ALARM MECHANISM

Original Filed May 19, 1931 2 Sheets-Sheet 2

Inventor
Clifton P. Howard
By Attorneys
Southgate Fay & Hawley

Reissued Feb. 5, 1935 Re. 19,447

UNITED STATES PATENT OFFICE 19,447

CONTROL DEVICE FOR ALARM MECHANISM

Clifton P. Howard, Worcester, Mass., assignor, by mesne assignments, to The Gamewell Company, Newton, Mass., a corporation of Massachusetts Original No. 1,891,541, dated December 20, 1932, Serial No. 538,494, May 19, 1931. Application for reissue September 8, 1934, Serial No. 743,298

19 Claims. (Cl. 200—142)

This invention relates to mechanism for sounding an alarm at some distant point upon an excessive rise in atmospheric temperature in an area protected by the alarm mechanism. Such alarm mechanism may be used in places where the opening of a sprinkler head cannot be permitted, or it may be used as additional protection.

It is the object of my invention to provide an improved control device for such an alarm mechanism, so designed that it may be held in normal condition by a heat-releasable fusible link.

A further object of my invention is to so construct my improved control device that it may be assembled on the cover plate of an ordinary junction box.

My invention further relates to arrangements and combinations of parts which will be hereinafter described and more particularly pointed out in the appended claims.

A preferred form of the invention is shown in the drawings, in which

Figure 1:
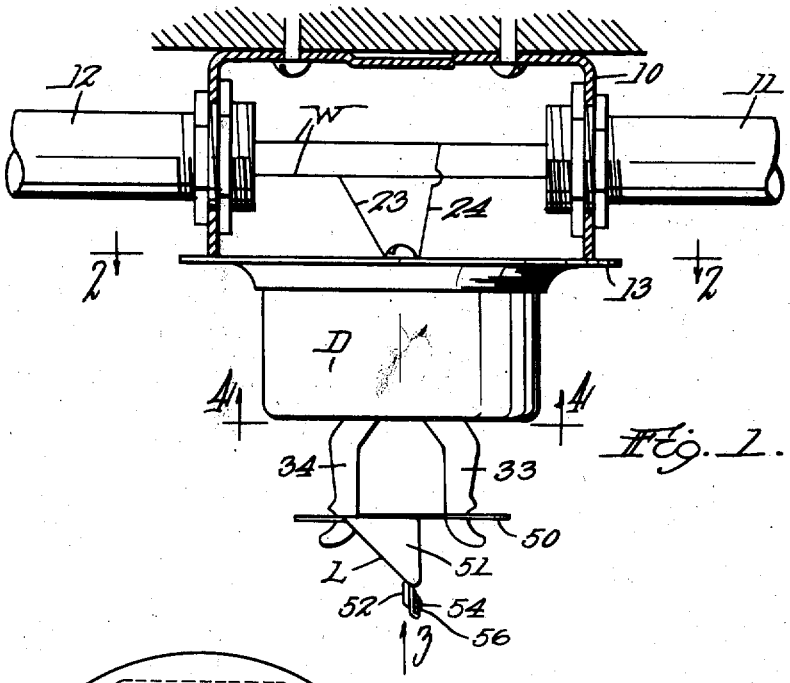
Fig. 1 is a side elevation, partly in section, showing a junction box with my improved control device mounted thereon.

Referring to the drawings, I have shown a junction box 10 of a usual commercial form, having conduits 11 and 12 connected thereto. A cover plate 13 is secured to the junction box 10 by screws 14, and my improved control device D is preferably mounted on and supported by the cover plate 13.

The cover plate 13 is formed with a depressed or cup-shaped portion 15 (Fig. 5) having a slot 16 (Fig. 4) in its lower end face or bottom. The cover plate 13 is also provided with a shoulder 18 (Fig. 8) which supports a disc 20 of non-conducting material. Contact members 21 and 22 are mounted on the disc 20 and are connected to wires 23 and 24 in the junction box 10.

Figure 2:
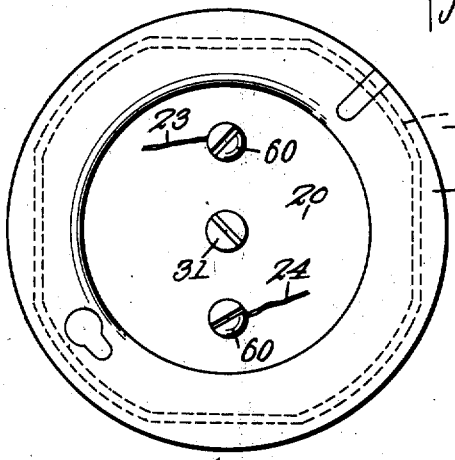
Fig. 2 is a plan view of the control device, taken along the line 2—2 in Fig. 1.
Figure 7:
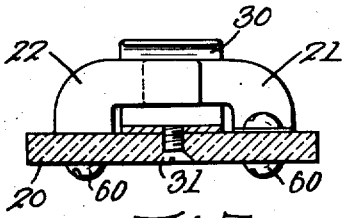
Fig. 7 is a sectional side elevation, taken along the line 7—7 in Fig. 6.
Figure 6:
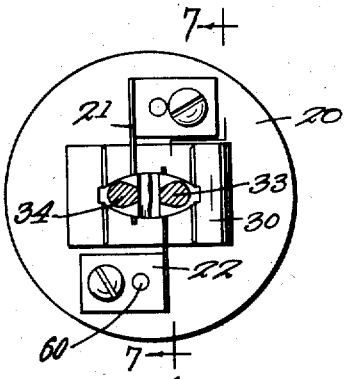
Fig. 6 is a sectional bottom view, taken along the line 6—6 in Fig. 5.

A heavy U-shaped or bow spring 30 formed of a broad resilient plate is secured at the middle thereof to the disc 20 by a screw 31 (Figs. 2 and 7) and the inner offset ends of the contact members 21 and 22 are extended toward each other and are positioned in the opening between the ends of the spring 30.

Figure 4:
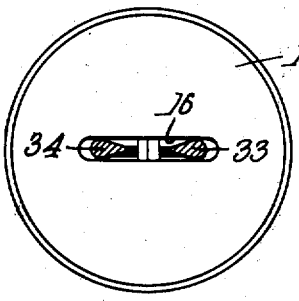
Fig. 4 is a detail sectional view, taken along line 4—4 in Fig. 1.
Figure 8:
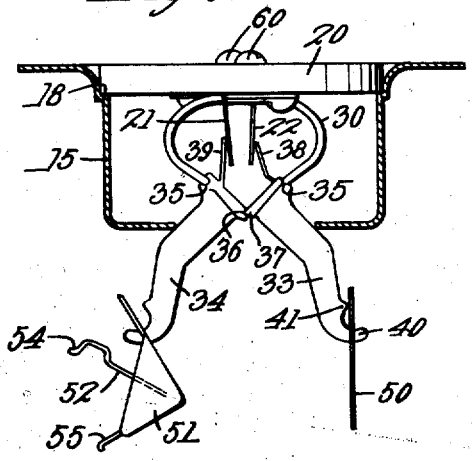
Fig. 8 is a view similar to Fig. 5 but showing the parts released.

Toggle levers 33 and 34 extend through the slot 16 in the cover 13, as indicated in Figs. 4 and 8. The levers 33 and 34 are notched in their outer base portions, as indicated at 35, to receive the ends of the spring 30 which exert pressure endwise of the toggle tending to collapse it. The base portion of the lever 34 is also notched at 36 to receive the projecting corner 37 of the lever 33.

Contact plates 38 and 39 project inward from the base portions of the toggle levers 33 and 34 to positions adjacent the offset ends of the contact members 21 and 22.

Figure 3:
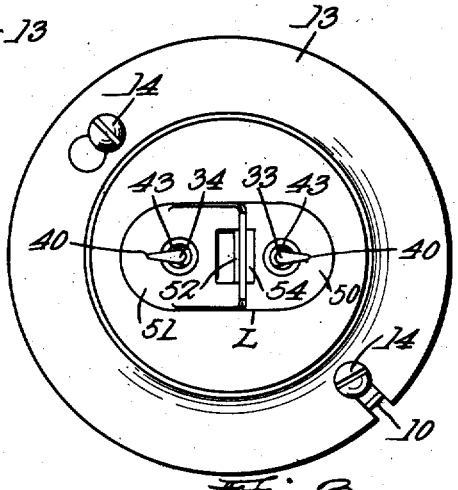
Fig. 3 is a bottom view of the device, looking in the direction of the arrow 3 in Fig. 1.

The outer ends of the toggle levers 33 and 34 are provided with hook-shaped portions 40 and with projections 41. The hook-shaped portions are designed to extend through openings 43 (Fig. 3) in the ends of a fusible link L, by which the toggle members are normally maintained in the set position shown in Fig. 5, with the contact plates 38 and 39 spaced away from the contact members 21 and 22. The projections 41 prevent inward displacement of the link.

The fusible link L or heat responsive device may be of any usual or commercial construction and is shown herein as comprising a flat link member 50 (Fig. 8) and bracket member 51 and a locking member 52. The members 50 and 51 are normally positioned face to face, as indicated in Fig. 5, and one end of the locking member 52 extends through aligned slots in the members 50 and 51.

The extreme outer end of the locking member 52 is preferably hook-shaped, as indicated at 54 in Fig. 8, and extends through a slot in the extreme outer end portion 55 of the bracket member 51, where it is secured by a portion of low-melting alloy or solder 56. The alloy or solder 56 which holds the member 52 in locking position is in compression or shear and not under tension.

The fusible link herein shown forms no part in itself of my present invention and is described in detail in the copending application of George I. Rockwood, Serial No. 520,041, filed March 4, 1931.

Figure 5:
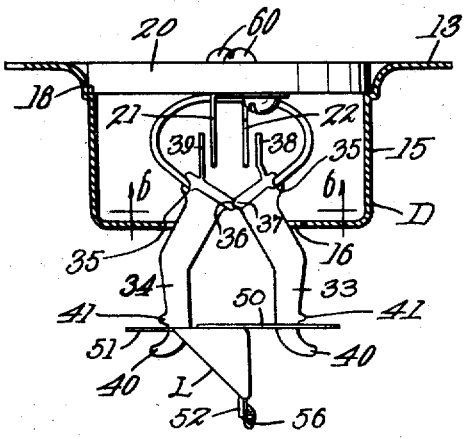
Fig. 5 is a sectional side elevation of the control device.

When the parts are assembled as shown in Fig. 5, the wires 23 and 24 are connected to the contact members 21 and 22 by binding screws 60, and the cover plate 13 is then secured to the junction box 10. As many of these control devices may be provided as is necessary to fully protect the defined area.

The control devices D, when designed for use on an open circuit system as indicated in Figs. 1 to 8, will be mounted in parallel between the wires W (Fig. 1) of the alarm circuit. On an excessive rise in temperature, the solder on the fusible link will melt, allowing the parts of the link to separate, as shown in Fig. 8, and the spring 30 will swing the toggle levers 33 and 34 to the collapsed position also shown in Fig. 8, causing the contact plates 38 and 39 to firmly engage the contact members 21 and 22, thus closing the circuit between the wires W and causing the alarm to sound. The toggle levers 33 and 34 are formed of bronze or other suitable metal, so that the circuit is completed through the contacting portions of the toggle levers and also through the spring 30.

Figure 9:
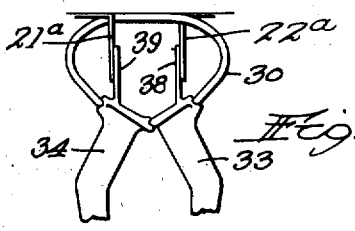
Fig. 9 is a detail view showing a slightly modified construction.

If the device is to be used on a closed circuit system, the contact members $21^a$ and $22^a$ (Fig. 9) are spaced outside of the contact plates 38 and 39, instead of between the plates, so that they are engaged by the contact plates when the toggle levers are secured in normal position by the fusible link.

When the levers are released, the plates 38 and 39 move inward, as previously described, and by such movement are separated from the contact members $21^a$ and $22^a$, breaking the normally closed circuit. Otherwise the construction for closed circuit operation is identical with that for open circuit operation.

Having thus described my invention and the operation thereof, it will be seen that I have provided a very simple and reliable control device adapted to be assembled and supported on the cover plate of an ordinary junction box, and adapted to be easily installed in the wiring system of an alarm mechanism and at as many points in said wiring system as may be desired. The type of fusible link herein described is very quickly responsive to a change in temperature and my control device when used in conjunction with this quickly responsive fusible link is extremely reliable and accurate.

The arrangement of the toggle levers and the bow spring is such that the tension on the fusible link is low and yet positive. The endwise pressure of the bow spring on the toggle is practically constant whatever the condition of the toggle and the operating speed is high. The spring has but small movement and thus can be broad and hence reliable. The provision of a plate engaging the support and the operating mechanism only at its ends and middle eliminates necessity for a spring guide and the resultant friction and hence results in a quick action maintained indefinitely.

Having thus described my invention and the advantages thereof, I do not wish to be limited to the details herein disclosed, otherwise than as set forth in the claims, but which I claim is:—

1. A control device for alarm mechanism comprising a non-conducting support, contact members mounted on said support, a pair of toggle levers having portions adapted to engage said contact members, a spring having its ends in engagement with said levers and forming the entire and floating support for said levers, said spring tending to move said levers to change the operative relation of said lever portions and contact members, and heat-releasable means normally preventing such movement of said levers by said spring.

2. The combination in a control device as set forth in claim 1, in which the outer corner edges of the base portions of said two toggle levers are notched to receive the inwardly directed ends of said spring, and in which the inner corner edge of the base portion of one of said levers is notched to receive the inner corner edge of the base portion of the other toggle lever.

3. A contact device for alarm mechanism comprising a cup-shaped support, a non-conducting plate mounted in said support, but spaced from the bottom thereof, a heavy U-shaped spring mounted on said plate within said cup-shaped support, a pair of spaced contact members mounted on said plate, a pair of toggle levers engaged with each other and with the ends of said spring and entirely supported by said spring, said levers having portions adapted to engage said contact members, and heat-releasable means restraining movement of said levers by said spring to change the operative relation of said levers and contact members.

4. A contact device for alarm mechanism comprising a cup-shaped support, a non-conducting plate mounted in said support but spaced from the bottom thereof, a heavy U-shaped spring mounted on said plate within said cup-shaped support, a pair of spaced contact members mounted on said plate and having portions positioned within the curve of said spring, a pair of toggle levers having portions adapted to engage said contact members, and heat-releasable means restraining movement of said levers by said spring, said levers when released being moved by said spring to change the operative relation of said levers and contact members.

5. The combination in a control device as set forth in claim 4, in which the cup-shaped support has a slotted bottom, and in which portions of the toggle levers extend outward through said slot to receive and support said heat-releasable means.

6. The combination in a control device as set forth in claim 4, in which the heat-releasable means comprises a fusible link connecting the outer ends of said levers and formed in separate parts normally held together by a low-melting fusible alloy.

7. A control device for an alarm system comprising a circuit controller, controller operating means, a support, a plate spring having an intermediate portion and an edge portion, one of which portions is engaged with said support and the other with said controller operating means, and a heat-responsive device acting on said spring and arranged releasably to hold it in a stressed position wherein it is biased for movement in a controller operating direction.

8. A control device for alarm mechanism comprising a circuit controller, an operating device for said controller, heat responsive means for releasably restraining said device from movement in a controller operating direction, a support, and a plate spring having intermediate and edge portions, one of said portions being engaged with said controller operating device and the other with said support, said spring being initially flexed for movement in a controller operating direction and held releasably from operation by said heat responsive means.

9. A control device for alarm mechanism comprising a circuit controller, a fixed support, a plate spring engaged with said support, a controller operating device carried and guided entirely by said spring, and heat responsive means engaged with said controller operating device for releasably holding said spring flexed for movement in a controller operating direction.

10. A control device for alarm mechanism comprising a circuit controller, a support, a controller operating device, a plate spring carried by said support and itself carrying said controller operating device, and heat responsive means releasably engaged with said controller operating device for releasably holding said spring flexed for movement in a controller operating direction.

11. A control device for alarm mechanism comprising a circuit controller, a controller operating device therefor, a support, a bow spring carried by said support and itself carrying said controller operating device, and heat responsive means which releasably restrains said spring in a position where it is stressed for movement in a controller operating direction.

12. A control device for alarm mechanism comprising a support having a recess, cooperating contact members in said recess, a bow spring carried by said support within said recess, a contact operating device carried by and moved with said spring, and heat releasable means restraining movement of said device and spring.

13. A control device for alarm mechanism comprising a support having a recess, cooperating contact members carried by said support within said recess, a bow spring carried by said support within said recess, a contact operating device engaged with the ends of and carried by said spring, and heat releasable means normally restraining movement of said device and spring.

14. A control device for alarm mechanism comprising cooperating contacts, a support, a bow spring secured intermediate its ends to said support, a contact operating device engaged with the ends of said bow spring, and heat responsive means engaged with said contact operating device for holding it releasably against movement in a contact controlling direction and maintaining said spring stressed for movement in a contact controlling direction.

15. A control device for alarm mechanism comprising cooperating contact members, a support, a bow spring secured intermediate its ends to said support, a contact operating device engaged with the ends of and carried by said bow spring, and heat responsive means engaged with said contact operating device for holding said spring stressed for movement in a contact operating direction.

16. A control device for an alarm system comprising a normally set toggle, a circuit controller operated by said toggle upon the collapse thereof, spring means exerting a thrust endwise of the toggle for collapsing said toggle, and heat-responsive means for releasably holding said toggle in set condition.

17. A control device for an alarm system comprising a normally set toggle, a circuit controller operated by said toggle upon the collapse thereof and having cooperating contact members at least one of which is carried by said toggle, spring means exerting a thrust endwise of the toggle for collapsing it, and heat responsive means for releasably holding said toggle in set condition.

18. A control device for an alarm system comprising a normally set toggle, a circuit controller operated by said toggle upon the collapse thereof, spring means constituting a support for said toggle exerting a thrust endwise thereof for collapsing it, and heat responsive means for releasably holding said toggle in set condition.

19. A control device for an alarm system comprising a normally set toggle, a bow-spring having its ends constituting fulcrum supports for the ends of said toggle and exerting a thrust endwise of said toggle for collapsing it, heat responsive means for releasably holding said toggle against collapse, and a circuit controller operated by said toggle upon the collapse thereof.

CLIFTON P. HOWARD.